United States Patent [19]

Moore

[11] Patent Number: 5,026,231

[45] Date of Patent: Jun. 25, 1991

[54] AUTOMOTIVE BARRIER NET

[75] Inventor: Donal Moore, Northville, Mich.

[73] Assignee: Polytech Netting Industries, L.P.

[21] Appl. No.: 469,966

[22] Filed: Jan. 25, 1990

[51] Int. Cl.$^5$ ............................................. B61D 45/00
[52] U.S. Cl. ................................. 410/118; 410/117; 410/129; 280/749; 180/271
[58] Field of Search .............. 410/96, 115, 117, 118, 410/129, 141, 143; 296/24.1, 180.1, 50, 24.2; 180/271; 280/749, 748, 751

[56] References Cited

U.S. PATENT DOCUMENTS

| 2,997,331 | 8/1961 | Kudner | 296/24.1 |
| 3,049,373 | 8/1962 | Biggers | 296/106 |
| 3,169,781 | 2/1965 | Abruzzino | 280/749 |
| 3,367,707 | 2/1968 | Merriweather | 296/24.1 |
| 4,213,636 | 7/1980 | King | 280/749 |
| 4,763,944 | 8/1988 | Fry et al. | 296/50 |

Primary Examiner—Robert J. Spar
Assistant Examiner—Craig Slavin
Attorney, Agent, or Firm—Basile and Hanlon

[57] ABSTRACT

A barrier net replaces the metal bulkhead between the passenger and trunk compartments of an automobile. The barrier net comprises flexible, substantially inelastic webbing. The webbing is formed of a plurality of vertical, spaced straps and a plurality of horizontal, spaced straps traversing the vertical straps. The vertical strap is secured to the horizontal strap at each point where the two straps cross. The barrier net is attached in place between the passenger and trunk compartment.

2 Claims, 1 Drawing Sheet

AUTOMOTIVE BARRIER NET

BACKGROUND OF THE INVENTION

1. Field of the Invention

The present invention relates generally to barrier nets, and more specifically to a barrier net which replaces the metal bulkhead in an automobile between the trunk and passenger compartments.

2. Description of the Relevant Art

For the past several years, automobile manufacturers have strived to make cars more fuel efficient while at the same time increasing the safety standards. One of the ways in which fuel may be conserved is to make the car lighter. Thus, alternative materials such as plastics have replaced metal in many areas of the automobile.

However, as of yet, no suitable replacement has been found for the heavy, metal bulkhead between the trunk and passenger compartments of the standard automobile. Although many lighter materials exist, these materials cannot pass safety requirements since they cannot restrain cargo in the trunk from entering the passenger compartment. The suitable replacement materials that do exist are either cost prohibitive, or they have to be much wider than the standard sheet metal used and cannot therefore fit within the space constraints for a normal bulkhead.

Thus, it would be desirable to replace the metal bulkhead with a barrier net which is light weight, yet strong enough to meet safety standards.

SUMMARY OF THE INVENTION

The present invention solves the above-mentioned problems by providing a barrier net at a trunk forward end and suspended between a passenger compartment and a trunk compartment of an automobile. The barrier net comprises flexible, substantially inelastic webbing. The webbing comprises a plurality of vertical, spaced straps, and a plurality of horizontal, spaced straps traversing the vertical straps. Means are provided for securing the vertical strap to the horizontal strap at each point where the two straps cross. Also provided are means for attaching the barrier met to the forward end side walls.

BRIEF DESCRIPTION OF THE DRAWINGS

Other objects and features of the invention will become apparent by reference to the following specification and to the drawings, in which.

DETAILED DESCRIPTION OF THE PREFERRED EMBODIMENTS

Figure 1:
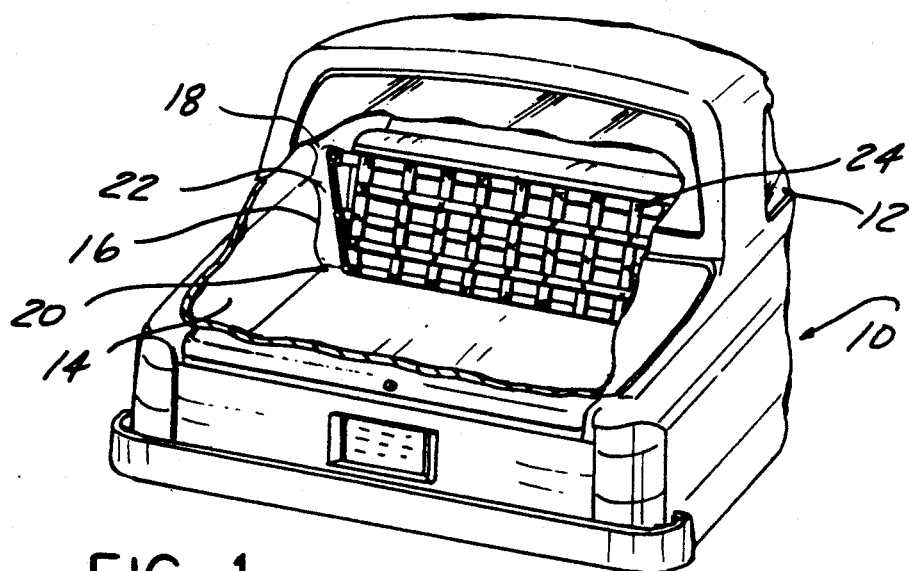
FIG. 1 is a cutaway perspective view showing the barrier net in place between the trunk and passenger compartments of an automobile.

Referring now to FIG. 1, there is shown an automobile having a car body 10 with a passenger compartment 12 and a trunk compartment 14. Trunk compartment 14 has a forward end 16. Forward end 16 has a top wall 18, a bottom wall 20, and two side walls 22 extending upwardly and outwardly from bottom wall 20. The barrier net of the present invention is designates generally as 24. Barrier net 24 is located at the trunk forward end 10 and is suspended between passenger compartment 12 and trunk compartment 14.

Figure 2:
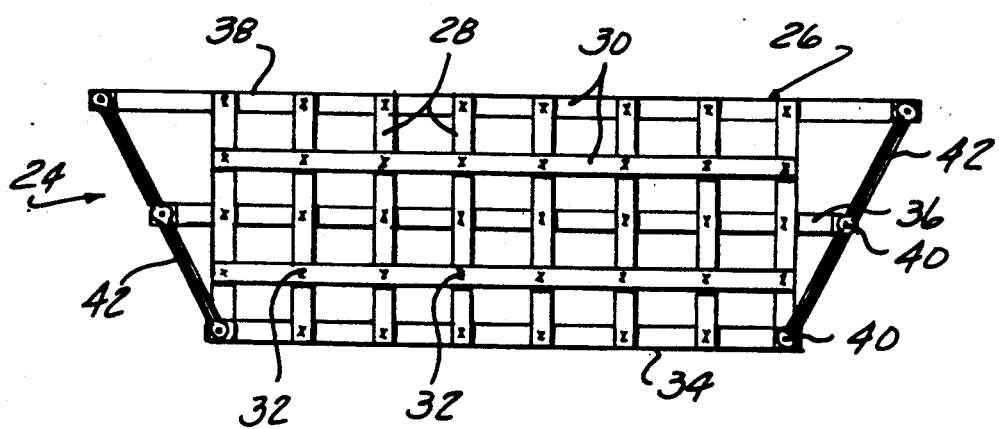
FIG. 2 is a front view of the barrier net with a mounting bracket attached to each side of the net.

Referring now to FIG. 2, barrier net 24 comprises flexible, substantially inelastic webbing 26. Webbing 26 may be made of any suitable material such as a textile material but in the preferred embodiment, webbing 26 is made from a reinforced multi-filament polypropylene or polyester. Webbing 26 comprises a plurality of vertical, spaced straps 28. A plurality of horizontal, spaced straps 80 traverse vertical straps 28. Means are provided for securing vertical strap 28 to horizontal strap 30 at each point where the two straps cross. This securing means may be any suitable means such as stitching, riveting, or sonic welding. FIG. 2 shows stitching 32 securing the straps.

Barrier net 24 can be any shape or configuration as long as it conforms to a space defined by the top 18, bottom 20 and side walls 22 of forward end 16. In the preferred embodiment, barrier net 24 conforms to this space as shown in FIG. 2. A lower horizontal webbing strap 34 has a length less than that of a middle horizontal webbing strap and the middle horizontal webbing strap length is less than that of an upper horizontal webbing strap 38. In this way, a plane containing the ends of straps 34, 36 and 38 would conform lo upwardly and outwardly extending side wall 22.

Figure 3:
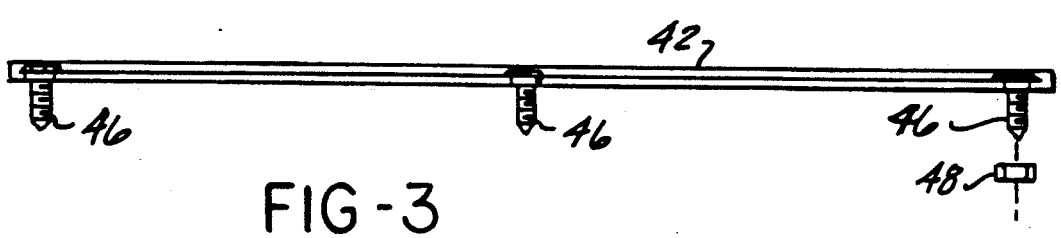
FIG. 3 is an enlarged side view of the mounting bracket with a nut shown exploded from one of the screws.
Figure 4:
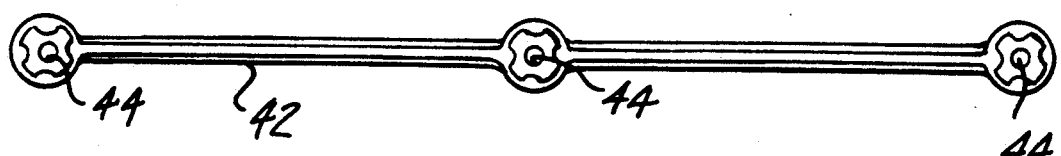
FIG. 4 is a top view of the mounting bracket.

Means are provided for attaching barrier net 24 to the forward end side walls 22. This attaching means may comprise any suitable means. In the preferred embodiment, an aperture 40 is formed in each end of each of the lower middle and upper horizontal webbing straps, 34, 36 and 38 respectively. A mounting bracket 42, as best seen in FIGS. 3 and 4, has two ends and a middle, and an aperture 44 formed in each of the ends and the middle of bracket 42. Brackets 42 may be made of any suitable material including a sheet metal, and in the preferred embodiment, this bracket material is a rigid plastic.

The barrier net attaching means further comprises means, receivable through the bracket and webbing apertures, 44, 40 respectively, and through an aperture (not shown) in the forward end side wall 22, for attaching bracket 42 to webbing 26 and to the forward end side wall 22. This bracket attaching means may comprise any suitable means. In the preferred embodiment, this means comprises a screw 40 and nut 48.

The barrier net may also comprise a separate means for keeping barrier net 24 taut. This may be accomplished simply by fitting the webbing 26 exactly to the space requirements defined by the configuration of the forward end. Then, when net 24 is attached in place by brackets 42, the net will be taut. However, this may also be done by any conventional tensioning means.

The barrier net 24 of the present invention is extremely light weight due to the use of the aforementioned webbing materials and the plurality of spaces formed by using horizontal and vertical straps. The webbing is also strong enough to restrain a hundred pounds of cargo in the trunk area from entering the passenger compartment under crash test conditions decelerating from 20 mph to a sudden stop of 0 mph. Barrier net 24 thus eaves cost and weight on a vehicle while safety restraining cargo in the trunk area.

While one embodiment of the invention has been described in detail, it will be apparent to those skilled in the art the disclosed embodiment may be modified.

Therefore, the foregoing description is to be considered exemplary rather than limiting, and the true scope of the invention is that defined in the following claims.

What is claimed is:

1. In an automobile having a car body with a passenger compartment and a trunk compartment, the trunk compartment having a forward end with a top wall, a bottom wall, and two side walls extending upwardly and outwardly from the bottom wall, the improvement comprising:

a barrier net at the trunk forward end and suspended between the passenger compartment and the trunk compartment, the barrier net comprising:

flexible, substantially inelastic webbing, the webbing comprising:

a plurality of vertical, spaced straps;

a plurality of horizontal, spaced straps traversing the vertical straps; and means for securing the vertical strap to the horizontal strap at each point where the two straps cross;

wherein a lower horizontal webbing strap has a length less than that of a middle horizontal webbing strap, and the middle horizontal webbing strap length is less than that of an upper horizontal webbing strap;

an aperture formed in each end of each of the lower, middle and upper horizontal webbing straps;

two mounting brackets each having two ends and a middle, and an aperture formed in each of the ends and the middle of both brackets;

screws receivable through each of the respective bracket apertures, each of the respective strap apertures and each respective aperture in the forward end side walls; and nuts securing the respective screws to the forward end side walls.

2. In an automobile having a car body with a passenger compartment and a trunk compartment, the trunk compartment having a forward end with a top wall, a bottom wall, and two side walls extending upwardly and outwardly from the bottom wall, the improvement comprising:

a barrier net at the trunk forward end and suspended between the passenger compartment and the trunk compartment, the barrier net comprising:

flexible, substantially inelastic, reinforced multi-filament polypropylene webbing, the webbing comprising:

a plurality of vertical, spaced straps;

a plurality of horizontal, spaced straps traversing the vertical straps; and securing stitching through the vertical strap and the horizontal strap at each point where the two straps cross;

wherein a lower horizontal webbing strap has a length less than that of a middle horizontal webbing strap, and the middle horizontal webbing strap length is less than that of an upper horizontal webbing strap;

an aperture formed in each end of each of the lower, middle and upper horizontal webbing straps;

two plastic mounting brackets each having two ends and a middle, and an aperture formed in each of the ends and the middle of both brackets;

screws receivable through each of the respective bracket apertures, each of the respective strap apertures and each respective aperture in the forward end side walls; and nuts securing the respective screws to the forward end side walls.

* * * * *